(12) United States Patent
Schäfer et al.

(10) Patent No.: US 7,319,204 B2
(45) Date of Patent: Jan. 15, 2008

(54) LASER WELDING DEVICE AND METHOD

(75) Inventors: Peter Schäfer, Schramberg (DE); Frank Faisst, Schramberg (DE); Martin Huonker, Zimmern (DE); Richard Petersen, Villngendorf (DE)

(73) Assignee: Trumpf Laser GmbH + Co. KG, Schramberg (DE)

( * ) Notice: Subject to any disclaimer, the term of this patent is extended or adjusted under 35 U.S.C. 154(b) by 0 days.

(21) Appl. No.: 11/281,265

(22) Filed: Nov. 17, 2005

(65) Prior Publication Data

US 2006/0102600 A1 May 18, 2006

(30) Foreign Application Priority Data

Nov. 17, 2004 (EP) .................................. 04027273

(51) Int. Cl.
*B23K 26/20* (2006.01)
*B23K 26/14* (2006.01)

(52) U.S. Cl. .............................. 219/121.63; 219/121.84

(58) Field of Classification Search ........... 219/121.63, 219/121.64, 121.84
See application file for complete search history.

(56) References Cited

U.S. PATENT DOCUMENTS

| 4,000,392 | A | * | 12/1976 | Banas et al. ............ 219/121.84 |
| 4,078,167 | A | * | 3/1978 | Banas et al. ............ 219/121.84 |
| 4,128,753 | A | * | 12/1978 | Sharp ..................... 219/121.84 |
| 4,319,120 | A | * | 3/1982 | la Rocca ................ 219/121.84 |
| 4,377,735 | A | * | 3/1983 | Minamida et al. ...... 219/121.64 |
| 4,642,445 | A | * | 2/1987 | Stol ........................ 219/121.84 |
| 4,723,063 | A | | 2/1988 | Armier et al. |
| 4,990,741 | A | * | 2/1991 | Moores et al. .......... 219/121.64 |
| 4,992,643 | A | | 2/1991 | Fuerschbach et al. |
| 5,961,858 | A | * | 10/1999 | Britnell ................... 219/121.63 |
| 6,177,046 | B1 | | 1/2001 | Simkovich et al. |
| 2002/0040894 | A1 | | 4/2002 | Borstel |
| 2005/0224470 | A1 | * | 10/2005 | Burt et al. .............. 219/121.63 |

FOREIGN PATENT DOCUMENTS

| DE | 3822097 | 1/1990 |
| DE | 3923829 | 1/1991 |
| DE | 4435531 | 4/1995 |
| EP | 1 206 998 | 5/2002 |

(Continued)

OTHER PUBLICATIONS

Jones et al., "Advanced cutting, welding and inspection methods for vacuum vessel assembly and maintenance", Fusion Engineering and Design, 51-52, 2000, pp. 895-991.

(Continued)

*Primary Examiner*—Geoffrey S. Evans
(74) *Attorney, Agent, or Firm*—Fish & Richardson P.C.

(57) ABSTRACT

A laser welding device includes a laser that generates a laser beam, an optics, and a limiting apparatus. The optics has a focal length of at least 200 nm and being configured to focus the laser beam onto a processing zone of a workpiece. The limiting apparatus limits a mixture of welding gases and heated ambient air, produced during laser welding, within the laser beam to a region that is less than the focal length from a surface of the workpiece.

24 Claims, 5 Drawing Sheets

FOREIGN PATENT DOCUMENTS

| | | | |
|---|---|---|---|
| GB | 2 390 319 | | 1/2004 |
| JP | 61-232087 A | * | 10/1986 ............ 219/121.64 |
| JP | 1-107994 A | * | 4/1989 |
| JP | 4-81290 A | * | 3/1992 |
| JP | 9-1374 A | * | 1/1997 |
| JP | 9-70682 A | * | 3/1997 |
| JP | 11-267874 A | * | 10/1999 |
| WO | WO 95/03911 | | 2/1995 |

OTHER PUBLICATIONS

Machan et al., "New Materials Processing Capabilities Using a High Brightness, 3 kW Diode-Pumped, YAG Laser", 2000 Aerospace Conference Proceedings, vol. 3, pp. 107-113, IEEE, 2000.

* cited by examiner

LASER WELDING DEVICE AND METHOD

CROSS REFERENCE TO RELATED APPLICATIONS

This application claims priority under 35 U.S.C. §119(a) to European Patent Application No. 04 027 273.4, filed Nov. 17, 2004, the entire contents of which are hereby incorporated by reference.

TECHNICAL FIELD

This application relates to a laser welding device for focusing a laser beam onto a processing zone of a workpiece.

BACKGROUND

For high-performance lasers with high beam quality (such as $CO_2$, disc, rod, and fiber lasers), the power densities required for deep welding can be achieved with large focal lengths (that is, >about 200 mm), which permits performance of welding processes at large working distances (that is, "remote welding"). In such remote welding processes, which are carried out directly at the processing location without a processing gas (that is, a working gas), the welding results show very large fluctuations in welding depth or root formation in through welds. A through weld is a weld that extends the whole thickness of the workpiece, which can be made of, for example, sheet metal. These fluctuations range from a lack of a through weld with only little developed tempering colors on a rear side of the sheet metal (that is, the workpiece to be welded) to a through weld. These variations in a welding seam have been observed in welding with solid state lasers since disc lasers used together with focusing optics produce a large focal length. The welding seam fluctuations occur, in particular, with F numbers (F number=focal length of the focusing lens/beam diameter on the focusing lens) that are larger than 8.

SUMMARY

In one general aspect, a laser welding device includes a laser that generates a laser beam, an optics defining a focal length of at least 200 mm, and configured to focus the laser beam onto a processing zone of a workpiece, and a limiting apparatus. The limiting apparatus limits a mixture of welding gases and heated ambient air, produced during laser welding, within the laser beam to a region that is less than the focal distance away from the workpiece.

Implementations can include one or more of the following features. For example, the region may extend from the processing zone to less than about 150 mm from the processing zone. The region may extend from the processing zone to less than about 100 mm from the processing zone.

The limiting apparatus may generate at least one gas flow that is directed into the laser beam and penetrates through the laser beam. The at least one gas flow may have a flow rate that is sufficiently slow to prevent influence of the gas flow on the processing zone. The at least one gas flow in the laser beam may be directed at an inclination relative to the processing zone. The at least one gas flow may be directed into the laser beam as a divergent beam.

The limiting apparatus may generate several gas flows around the laser beam, and the several gas flows may penetrate through the laser beam. The limiting apparatus may generate an annular gas flow that is disposed coaxially to the laser beam and penetrates through the laser beam. The limiting apparatus may generate a negative pressure that draws the mixture away from the processing zone.

The limiting apparatus may be mounted to the optics. The limiting apparatus may be disposed between the processing zone and a cross-jet configured to protect the optics. The limiting apparatus may be disposed on a cross-jet nozzle. The limiting apparatus may be integrated in a cross-jet nozzle.

A protection gas, which protects the processing zone from oxidation, may be provided between the processing zone and the limiting apparatus.

In another general aspect, a laser welding device includes a laser that generates a laser beam, an optics configured to focus the laser beam onto a processing zone of a workpiece to weld the workpiece in the processing zone, the optics defining a focal length, and a limiting apparatus. The limiting apparatus is configured to limit a mixture of welding gases and heated ambient air, produced during laser welding, within the laser beam to a region between the optics and the workpiece without influencing the welding in the processing zone.

Implementations may include one or more of the following features. For example, the limiting apparatus may include a gas flow that emanates from a gas nozzle mounted to the optics. The gas flow may be disposed between the processing zone and a cross-jet configured to protect the optics. The gas flow may be configured to limit the mixture without preventing oxidation of the workpiece within the processing zone.

In another general aspect, a laser welding device includes a laser that generates a laser beam, an optics configured to focus the laser beam onto a processing zone of a workpiece to weld the workpiece in the processing zone, the optics defining a focal length, and a negative pressure configured to draw a mixture of welding gases and heated ambient air away from the processing zone.

In another general aspect, a laser welding method includes generating a laser beam from a laser, focusing the laser beam onto a processing zone of a workpiece to thereby weld the workpiece in the processing zone, by passing the laser beam through optics defining a focal length, and limiting a mixture of welding gases and heated ambient air, produced during laser welding, within the laser beam to a region between the optics and the workpiece without preventing oxidation of the workpiece within the processing zone.

Implementations may include one or more of the following features. For example, the limiting may include generating at least one gas flow that is directed into the laser beam and that penetrates through the laser beam. The limiting may include generating a negative pressure to draw the mixture away from the processing zone. The laser welding method may also include protecting the optics with a cross-jet.

In one general aspect, a laser welding device includes a limiting apparatus that limits the mixture of welding gases (for example, welding smoke and metal vapor) and heated ambient air, produced during welding, within a laser beam to a region close to a welding workpiece. It has been observed that the welding smoke that is discharged from the processing zone during laser welding and forced by the emitted metal vapor can be moved in the direction of the incident laser beam and can heat the ambient air. The intensity and the beam geometry of the incident laser beam are changed by this mixture of welding gases and heated ambient air. The influence of welding smoke or the metal vapor on the laser beam depends on the power density at the workpiece, the focusing angle of the laser beam, and the focal length of the focusing lens within the optics. In laser welding that uses focusing lenses having a smaller focal length, the beam path of the laser beam to the workpiece may not be long enough to cause any noticeable influence on the beam properties disturbing the process during conventional laser welding with short working distance between the welding nozzle and the workpiece. Moreover, with the lower beam quality of processing lasers, the beam diameter on the focusing lens and the focusing angle of the beam tend to be larger and the result is that the beam has a shorter high power density zone above the workpiece.

The influence of the welding smoke and the metal vapor to the welding process depends on the production rate, the welding speed, the degree to which the weld is formed through the workpiece, the melting bath volume, the material to be welded, and the vapor concentration in the overall processing space. To obtain uniform welding seams having a uniform root weld formation in welding with focusing optics of large focal length, the beam changes caused by the welding smoke and metal vapor are reduced.

The region of the laser beam remote from the workpiece is largely kept free of the mixture of welding gases and the heated ambient air by one or more gas flows (such as air) or a suction apparatus. A gas flow with a relatively small volume flow is directed onto the processing zone (also referred to as the joining zone) in the direction of the laser beam using a suitable gas nozzle, and the gas flow penetrates through the laser beam path. The gas flow can be directed onto the workpiece from above the workpiece. The gas nozzle may be disposed around the laser beam in the form of one coaxial nozzle or of several individual nozzles. The gas flow thereby does not have the function of a protection gas to prevent oxidation of the workpiece at the processing zone, but to preferably keep welding gases and heated ambient air out of the irradiated space of the incident laser light.

Welding seam fluctuations may also occur during conventional welding using $CO_2$ lasers having large power densities. This effect occurs because the laser radiation is shielded by laser-induced metal vapor plasma ("laser plasma") in the vapor channel of the processing zone. A process gas (working gas) is present directly at the processing zone to eliminate the shielding effect of the laser plasma. Also, during remote welding with $CO_2$ lasers, a process gas is present at the processing zone (that is, directly on the workpiece) in case of high power densities and can be provided by a clamp for the workpiece. The process gas additionally prevents the welding smoke from rising, in which case the above-described problem can arise if welding is performed without a process gas with low power density. The laser plasma is transparent for the wavelength of solid state lasers, for example, Nd:YAG lasers. In this case, a process gas may not be needed for conventional welding with Nd:YAG lasers.

In the laser welding device, welding seam fluctuations are reduced. The laser welding device allows deeper and more uniform weld seams compared to conventional laser welding devices.

Further features and advantages will be apparent from the description, the drawings and the claims. The features mentioned above and below may be used individually or collectively in arbitrary combination. The embodiments shown and described are not to be understood as an exhaustive enumeration but have exemplary character for describing the laser welding device and method.

DESCRIPTION OF DRAWINGS

Like reference symbols in the various drawings may indicate like elements.

DETAILED DESCRIPTION

Figure 1A:
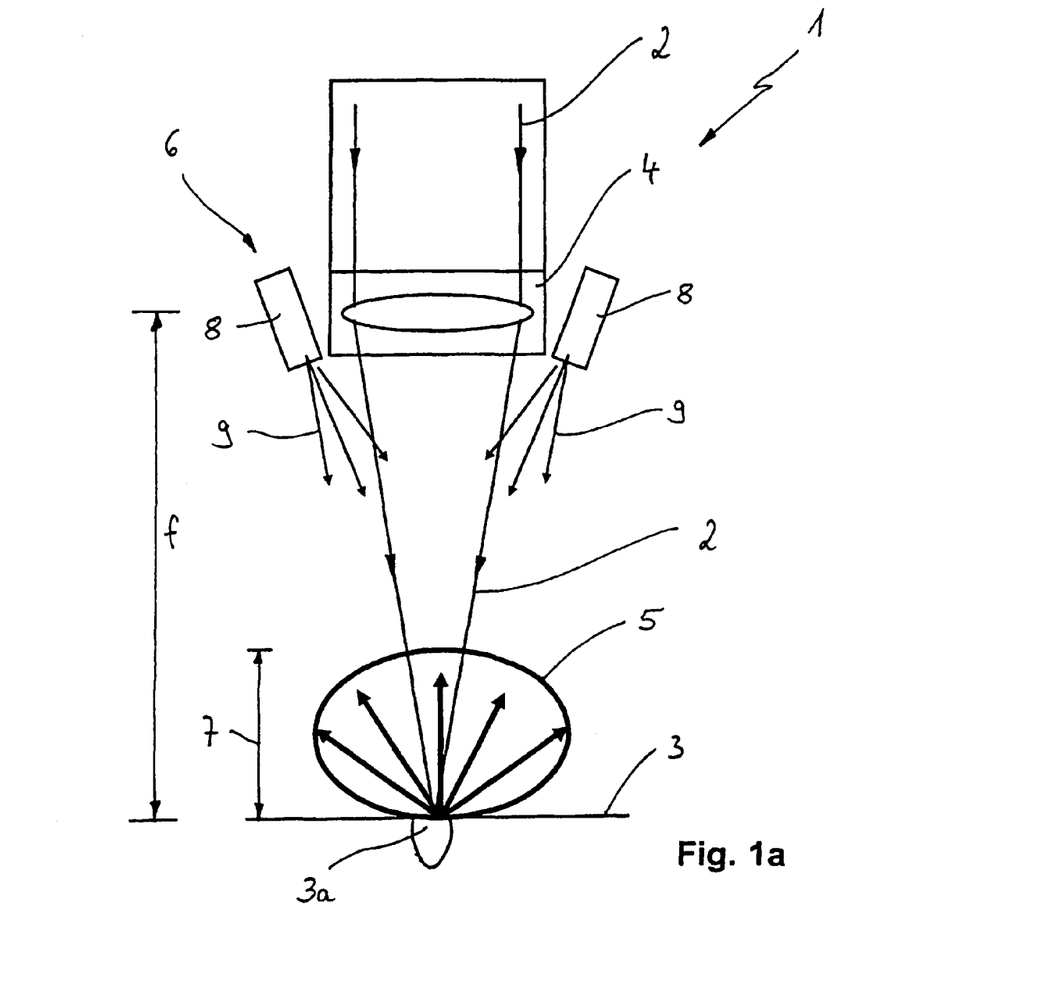
FIGS. 1a and 1b show a laser welding device including a limiting apparatus provided on a focusing optics (FIG. 1a) or on a scanner optics (FIG. 1b)

Referring to FIG. 1A, a laser welding device 1 includes a laser beam 2 generated by a laser such as a solid state laser (not shown), and a focusing optics 4 having a focal length f of at least 200 mm for focusing the laser beam 2 onto a processing zone 3a of a workpiece 3 to be welded.

Welding gases, such as welding smoke and metal vapors, escape from the processing zone 3a during laser welding, and the ambient air near the processing zone 3a is heated during the laser welding of the processing zone 3a. The welding gases and the heated ambient air blend together form a mixture 5 that rises from the processing zone 3a in the direction of the optics 4. The mixture 5 is formed in the path of the laser beam 2, and the mixture 5 changes the intensity and the beam geometry of the incident laser beam 2 at the welding seam, which can cause a too low and/or an irregular welding depth within the processing zone 3a. The welding seam is the region that is melted by the heat of the laser such that the metals flow together and join. A welding seam has an irregular welding depth if the welding depth varies along the length of the workpiece.

The laser welding device 1 includes a limiting apparatus 6 that reduces the penetration depth that the laser beam 2 overlaps the mixture 5. As shown in FIG. 1a, the limiting apparatus 6 is mounted on the focusing optics 4. The limiting apparatus 6 is configured to confine the mixture 5 of welding gases and heated ambient air produced during laser welding, within the focused laser beam 2 to a region 7 that extends up to about 100 to 150 mm from the workpiece.

The limiting apparatus 6 includes one or more gas nozzles 8 disposed around the incident laser beam 2. Each gas nozzle 8 directs a divergent flow of gas 9 with a relatively small volume flow onto the processing zone 3a and into the region 7 above the processing zone 3a. The gas is selected so as not to react with the laser beam 2. In one implementation, the gas is air. The gas flow 9 displaces the mixture 5 from the space irradiated by the incident laser beam 2 remote from the workpiece and above the region 7. The gas flow 9 is selected to have a flow rate and a flow pressure that is low enough that it does not influence the welding process, and in particular, is low enough that it does not influence the molten mass formed in the processing zone 3a during the laser welding. The gas flow 9 is selected to have a flow rate and a flow pressure that is low enough that the gas flow 9 does not function as a protection gas that would prevent oxidation of the workpiece 3 and therefore the gas flow 9 does not protect the weld seam from reacting with ambient air during cooling of the molten mass. For example, the gas flow rate can be a small flow rate and the pressure can be about 0.2 bar.

In another implementation, the one or more gas nozzles 8 are replaced by a single annular nozzle that is disposed coaxially to the laser beam 2.

Figure 1B:
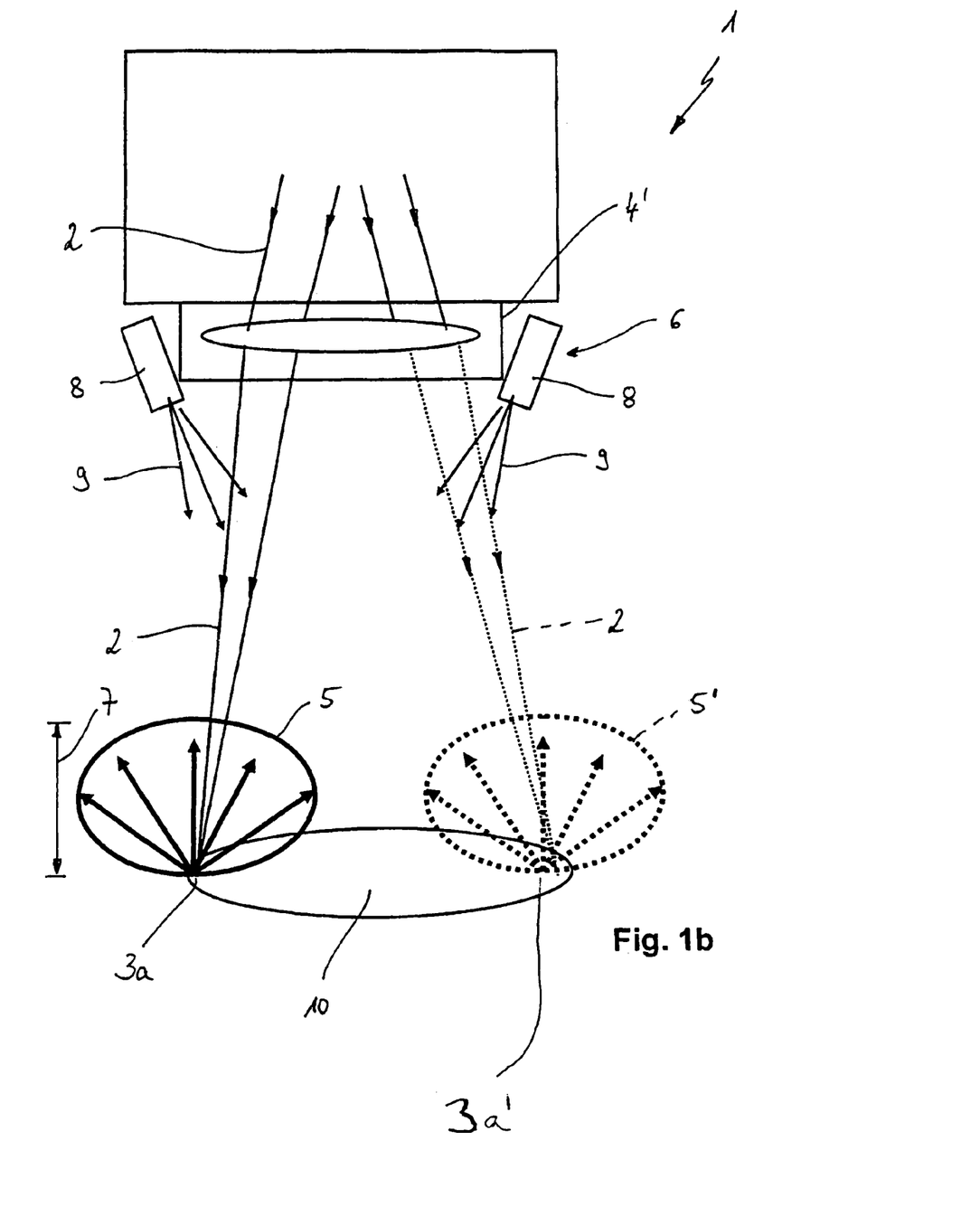

Referring to FIG. 1b, in another implementation, a laser welding device 1 differs from the laser welding device 1 of FIG. 1a in that the one or more gas nozzles 8 of the limiting apparatus 6 are mounted on a scanner optics 4'. The scanner optics 4' laterally deflects the incident laser beam 2 to control the position of the processing zone 3a within a processing area 10 on the workpiece 3. For example, as shown, the incident laser beam 2 can be deflected to a processing zone 3a' (as shown, mixture 5' forms above processing zone 3a' as discussed above).

Figure 2A:
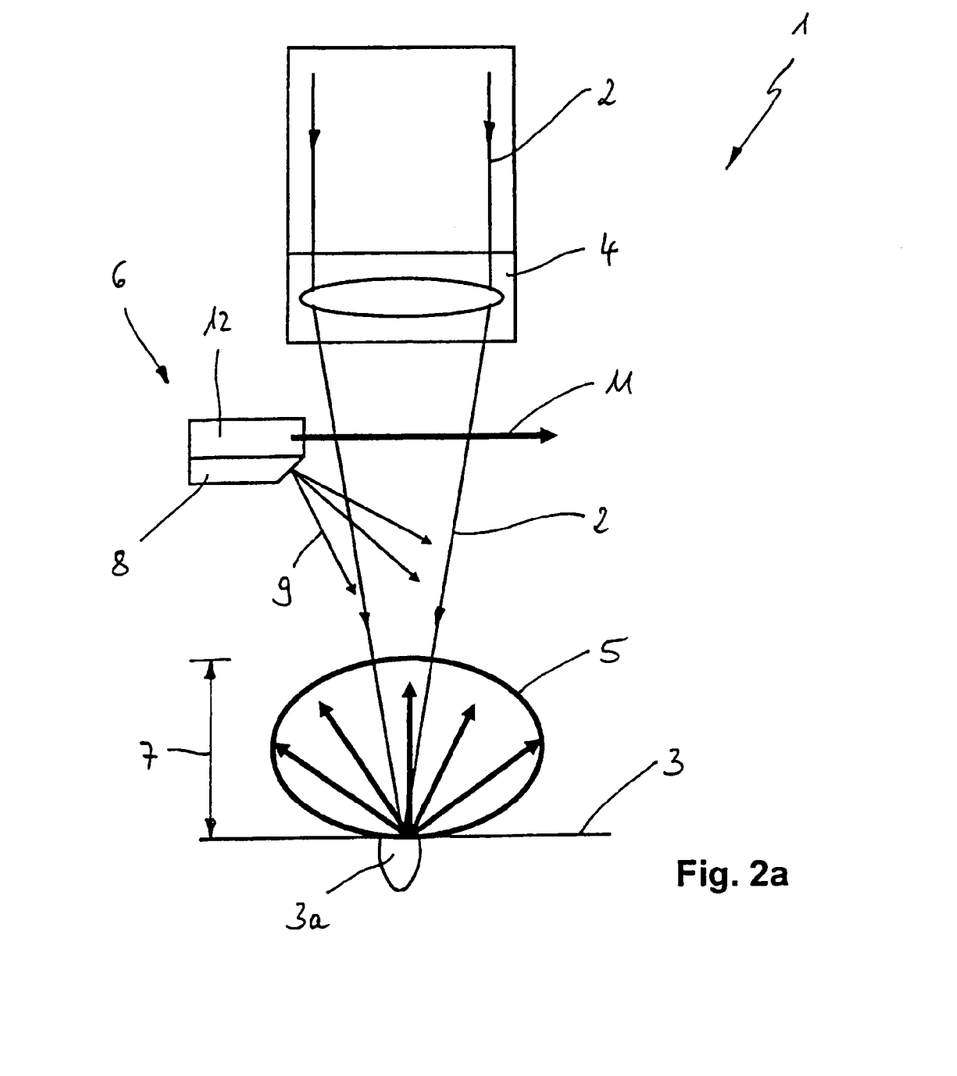
FIGS. 2a and 2b show a laser welding device including a limiting apparatus provided on a cross-jet nozzle, and including a focusing optics (FIG. 2a) or a scanner optics (FIG. 2b)

Referring to FIG. 2a, a laser welding device 1 differs from the laser welding device 1 of FIG. 1a in that the limiting apparatus 6 has a single gas nozzle 8 that is disposed between the processing zone 3a and a cross-jet air flow 11 that is close to the focusing optics 4 and is directed transversely to the incident laser beam 2. The cross-jet air flow 11 protects the focusing optics 4 from impinging splashes from the molten mass and is generated by a slot-shaped cross-jet nozzle 12 with a pressure of about several bars. As shown, the gas nozzle 8 is integrated in the cross-jet nozzle 12 in the form of an additional nozzle (slotted or concentric nozzle). In a variant of this design, a separate gas nozzle below the cross-jet nozzle 12 would also be suitable.

Figure 2B:
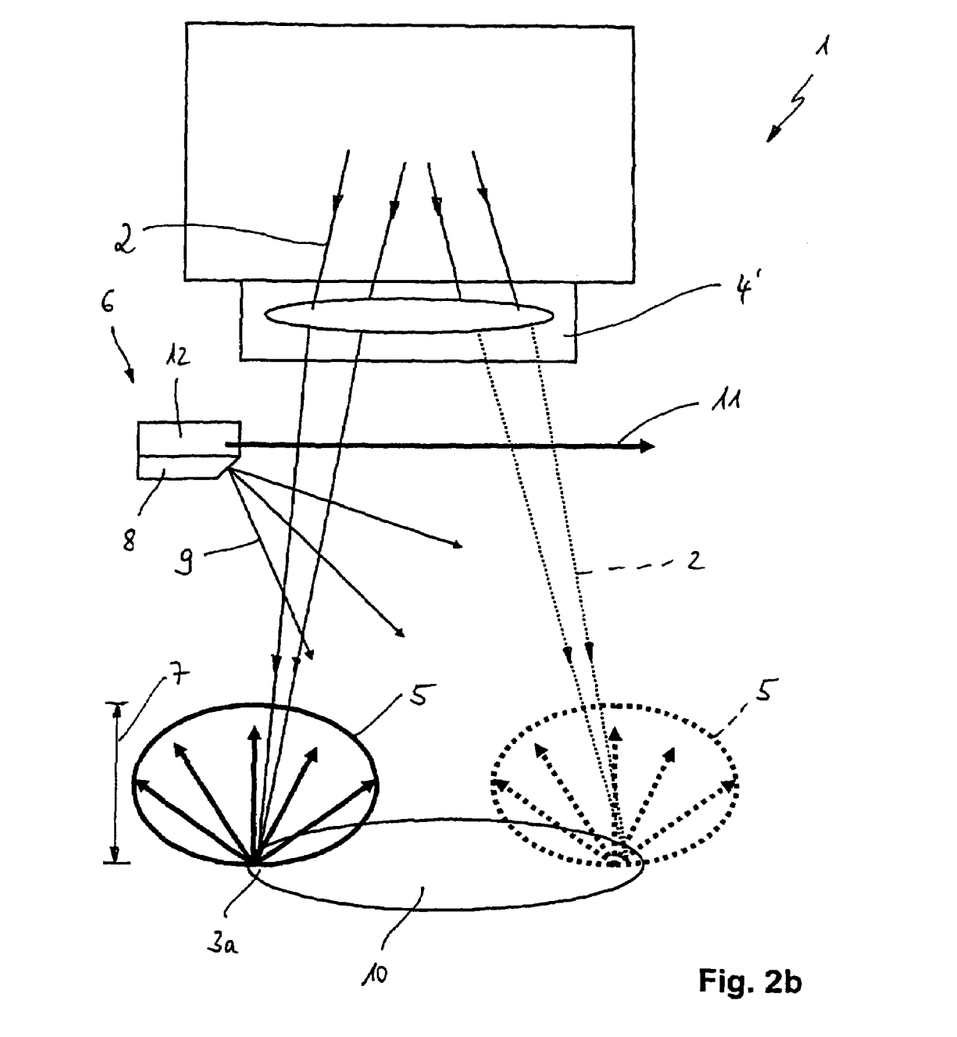

Referring to FIG. 2b, a laser welding device 1 differs from the laser welding device 1 of FIG. 2a in that a scanner optics 4' is provided instead of the focusing optics 4.

Figure 3:
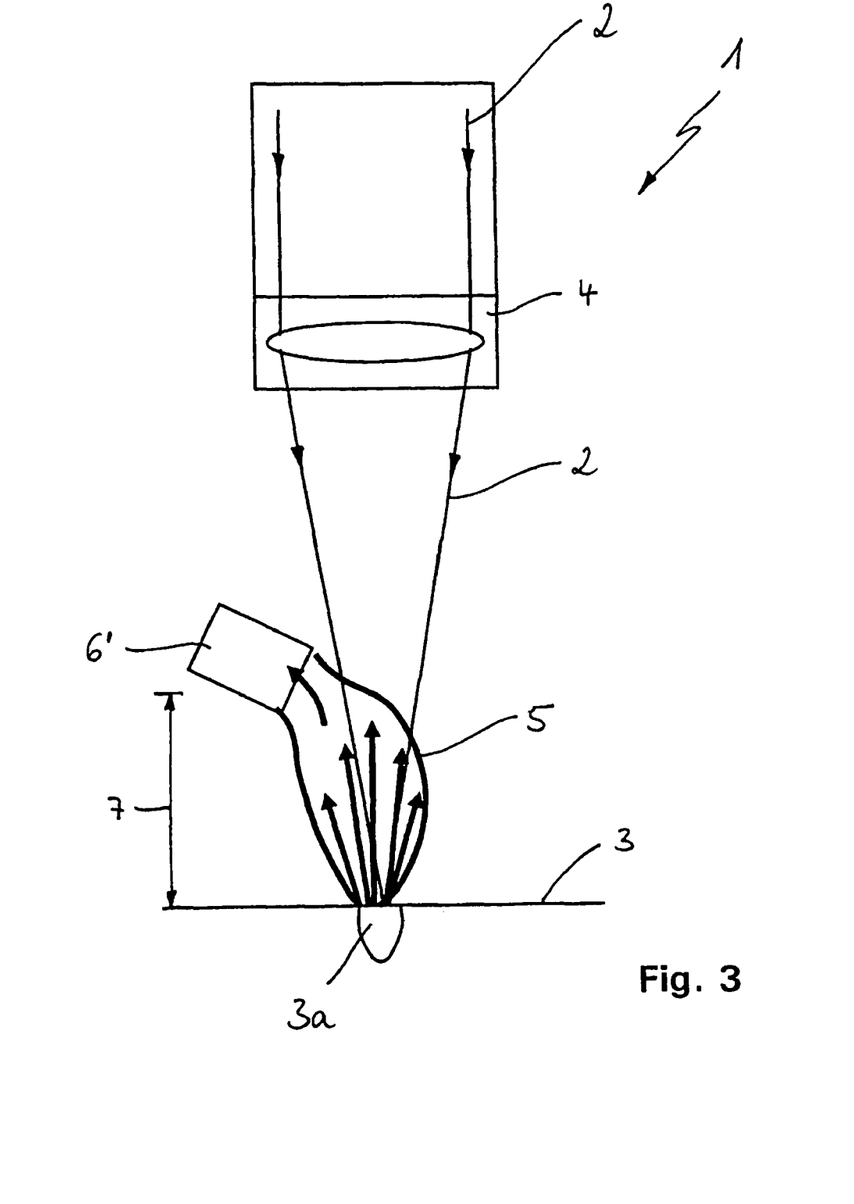
FIG. 3 shows a laser welding device including a limiting apparatus formed as suction device.

Referring to FIG. 3, a limiting apparatus 6' is disposed on the side next to the incident laser beam 2 and generates a negative pressure that acts to draw off the mixture 5 produced during laser welding. The limiting apparatus 6' is disposed outside of the region 7 but close to the workpiece 3 such that the mixture 5 within the focused laser beam 2 is limited to the region 7 close to the workpiece 3.

Other implementations are within the scope of the following claims.

For example, the laser welding device 1 may include a separate apparatus that produces a protection gas that protects the processing zone from oxidation. The protection gas would be provided between the processing zone and the limiting apparatus.

What is claimed is:

1. A laser welding device including:
   a laser that generates a laser beam,
   an optics defining a focal length of at least 200 mm, and configured to focus the laser beam onto a processing zone of a workpiece, and
   at least one gas nozzle disposed at a distance of at least 100 mm from the processing zone and generating at least one gas flow that is directed into the laser beam and that penetrates through the laser beam, wherein the gas flow of the at least one gas nozzle is directed to the processing zone, to a region in front of the processing zone, or to both the processing zone and the region in front of the processing zone such that a mixture of welding gases and heated ambient air, produced during laser welding, is limited within the laser beam to the region, wherein the region extends up to maximally about 150 mm from the processing zone and maximally to the gas nozzle.

2. The laser welding device of claim 1, wherein the region extends from the processing zone up to maximally about 100 mm from the processing zone.

3. The laser welding device of claim 1, wherein the at least one gas flow has a flow rate that is sufficiently slow to prevent influence of the gas flow on the processing zone.

4. The laser welding device of claim 1, wherein the at least one gas flow in the laser beam is directed at an inclination relative to the processing zone.

5. The laser welding device of claim 1, wherein the at least one gas flow is directed into the laser beam as a divergent beam.

6. The laser welding device of claim 1, wherein the one or more gas nozzles generate several gas flows around the laser beam, and the several gas flows penetrate through the laser beam.

7. The laser welding device of the claim 1, wherein the at least one gas nozzle generates an annular gas flow that is disposed coaxially to the laser beam and penetrates through the laser beam.

8. The laser welding device of claim 1, wherein the at least one gas nozzle is mounted to the optics.

9. The laser welding device of claim 1, wherein the at least one gas nozzle is disposed between the processing zone and a cross-jet configured to protect the optics.

10. The laser welding device of claim 9, wherein the at least one gas nozzle is disposed on a cross-jet nozzle.

11. The laser welding device of claim 9, wherein the at least one gas nozzle is integrated in a cross-jet nozzle.

12. The laser welding device of claim 1, wherein a protection gas, which protects the processing zone from oxidation, is provided between the processing zone and the at least one gas nozzle.

13. A laser welding device including:
    a laser that generates a laser beam,
    an optics configured to focus the laser beam onto a processing zone of a workpiece to weld the workpiece in the processing zone, the optics defining a focal length, and
    at least one gas nozzle that generates at least one gas flow that is disposed between the processing zone and a cross-jet configured to protect the optics and that is configured to limit a mixture of welding gases and heated ambient air, produced during laser welding, within the laser beam to a region that extends up a distance of less than the focal length from the processing zone between the optics and the workpiece without influencing the welding in the processing zone,
    wherein the gas flow is selected to have a flow rate and flow pressure that is low enough to limit the mixture without preventing oxidation of the workpiece within the processing zone.

14. The laser welding device of claim 13, wherein the at least one gas nozzle is mounted to the optics.

15. A laser welding device including:
    a laser that generates a laser beam,
    an optics defining a focal length of at least 200 mm, and configured to focus the laser beam onto a processing zone of a workpiece, and
    a suction apparatus disposed at a distance of at least 100 mm from the processing zone and generating a negative pressure that draws a mixture of welding gases and heated ambient air, produced during laser welding, within the laser beam away from a region that extends up to maximally about 150 mm from the processing zone and maximally to the suction apparatus such that the mixture is limited to the region.

16. The laser welding device of claim 15, wherein the region extends from the processing zone up to maximally about 100 mm from the processing zone.

17. The laser welding device of claim 15, wherein the suction apparatus is mounted to the optics.

18. The laser welding device of claim 15, wherein the suction apparatus is disposed between the processing zone and a cross-jet configured to protect the optics.

19. The laser welding device of claim 18, wherein the suction apparatus is disposed on a cross-jet nozzle.

20. The laser welding device of claim 18, wherein the suction apparatus is integrated in a cross-jet nozzle.

21. The laser welding device of claim 15, wherein a protection gas, which protects the processing zone from oxidation, is provided between the processing zone and the limiting apparatus.

22. A laser welding method including:
generating a laser beam from a laser,
focusing the laser beam onto a processing zone of a workpiece to thereby weld the workpiece in the processing zone, by passing the laser beam through optics defining a focal length of at least 200 mm, and
generating from a distance of at least 100 mm from the processing zone at least one gas flow that penetrates through the laser beam and is directed into the laser beam, to the processing zone or to the region in front of the processing zone to limit a mixture of welding gases and heated ambient air, produced during laser welding, within the laser beam to a region that extends up to maximally about 150 mm from the processing zone.

23. The laser welding method of claim 22, further comprising protecting the optics with a cross-jet.

24. A laser welding method including:
generating a laser beam from a laser,
focusing the laser beam onto a processing zone of a workpiece to thereby weld the workpiece in the processing zone by passing the laser beam through an optics defining a focal length of at least 200 mm, and
generating from a distance of at least 100 mm from the processing zone a negative pressure to draw a mixture of welding gases and heated ambient air, produced during laser welding, within the laser beam away from a region that extends up to maximally about 150 mm from the processing zone such that the mixture is limited to the region.

* * * * *